(12) United States Patent  
Georgeson et al.

(10) Patent No.: US 9,303,983 B2  
(45) Date of Patent: Apr. 5, 2016

(54) SEALANT ANALYSIS SYSTEM

(75) Inventors: Gary Ernest Georgeson, Tacoma, WA (US); William Talion Edwards, Foristell, MO (US)

(73) Assignee: THE BOEING COMPANY, Chicago, IL (US)

( * ) Notice: Subject to any disclaimer, the term of this patent is extended or adjusted under 35 U.S.C. 154(b) by 251 days.

(21) Appl. No.: 13/437,355

(22) Filed: Apr. 2, 2012

(65) Prior Publication Data

US 2013/0260016 A1 Oct. 3, 2013

(51) Int. Cl.
*B05D 7/00* (2006.01)
*G01B 21/08* (2006.01)
*G01B 11/06* (2006.01)

(52) U.S. Cl.
CPC ............ *G01B 21/08* (2013.01); *G01B 11/0616* (2013.01)

(58) Field of Classification Search
CPC ............................ G01B 21/08; G01B 11/0616
USPC ............................................................ 427/9
See application file for complete search history.

(56) References Cited

U.S. PATENT DOCUMENTS

| 4,456,379 A | 6/1984 | Schumann et al. |
| 4,826,380 A | 5/1989 | Henry |
| 4,971,745 A | 11/1990 | Ferenc et al. |
| 5,229,840 A | 7/1993 | Arnarson et al. |
| 8,315,834 B2 | 11/2012 | Gimelfarb et al. |
| 2003/0071194 A1 | 4/2003 | Mueller et al. |
| 2004/0104725 A1* | 6/2004 | Sergoyan et al. ............. 324/230 |
| 2005/0137829 A1 | 6/2005 | Gimelfarb et al. |
| 2008/0295579 A1* | 12/2008 | Safai et al. ........................ 73/40 |
| 2010/0110451 A1* | 5/2010 | Biswas et al. .................. 356/631 |
| 2013/0261876 A1* | 10/2013 | Froom et al. ................. 701/29.3 |

FOREIGN PATENT DOCUMENTS

| EP | 1643209 A2 | 4/2006 |
| EP | 2312267 A1 | 4/2011 |

OTHER PUBLICATIONS

Funane et al., "Optical scanning system for light-absorption measurement of deep biological tissue," Review of Scientific Instruments, vol. 82, Issue 9, Sep. 2011, pp. 93101-93101-8; abstract accessed Feb. 6, 2012, 2 Pages, http://rsi.aip.org/resource/1/rsinak/v82/i9/p093101_s1?isAuthorized=no.

Beach et al., "Geometric and Motion Sensors," Process/Industrial Instruments and Controls Handbook, Ch. 5, Sep. 1999, 119 Pages.

EP search report dated Jun. 28, 2013 regarding application 13161911.6-1558, reference NAM/P126204EP00, applicant The Boeing Company, 5 pages.

* cited by examiner

*Primary Examiner* — Xiao Zhao

(74) *Attorney, Agent, or Firm* — Yee & Associates, P.C.

(57) ABSTRACT

A method and apparatus for inspecting sealant on an object. First data is generated for a first geometry of a first surface of the object prior to sealing the object. Second data is generated for a second geometry of a second surface of the object after the sealant has been applied to the object. A difference is identified between the first data and the second data. The difference indicates a thickness of the sealant on the object.

17 Claims, 8 Drawing Sheets

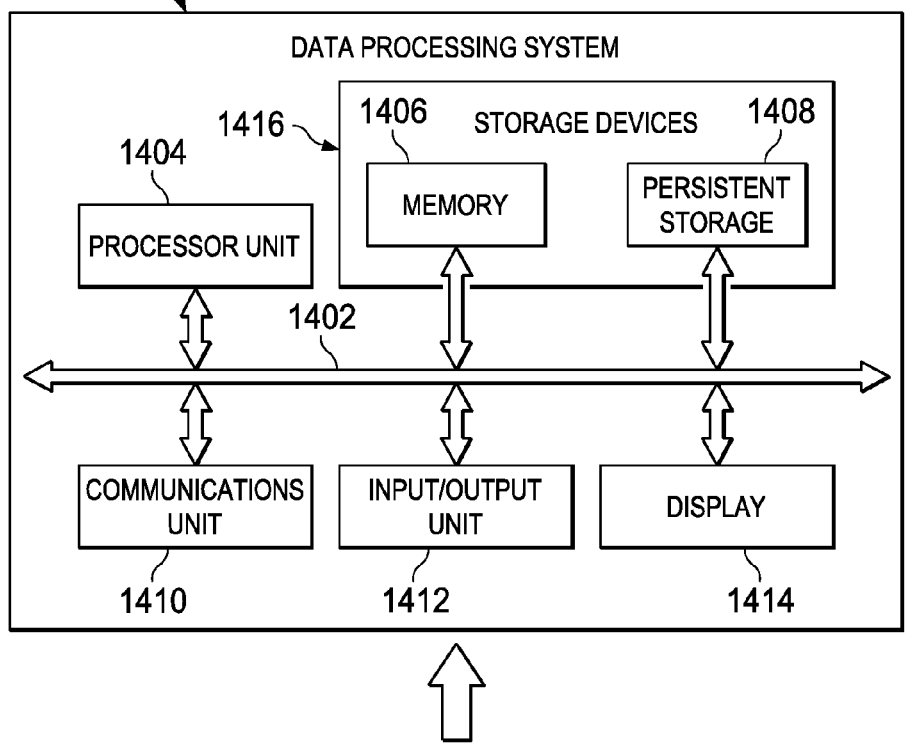
FIG. 14
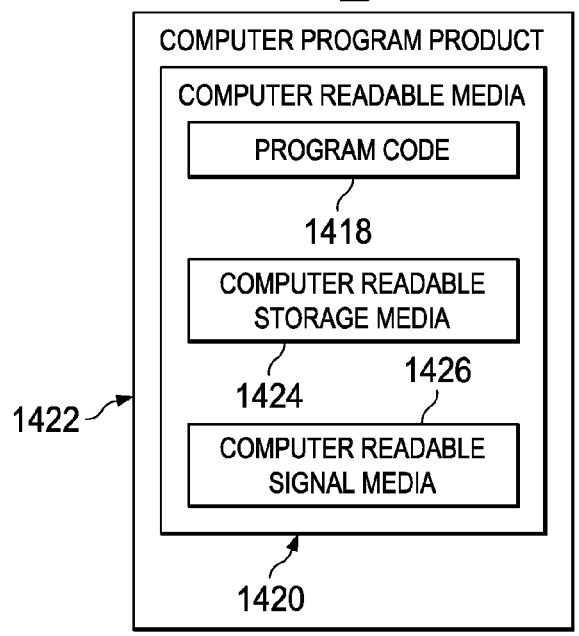

SEALANT ANALYSIS SYSTEM

BACKGROUND INFORMATION

1. Field

The present disclosure relates generally to manufacturing aircraft and, in particular, to sealing structures in aircraft. Still more particularly, the present disclosure relates to a method and apparatus for identifying a thickness of sealant on fasteners in an aircraft.

2. Background

In manufacturing aircraft, sealants are used for a number of different purposes. For example, a sealant may be used to form a barrier against undesired elements. The barrier may be formed to seal gaps, holes, and other features that may allow elements to pass in an undesired manner. These elements may include air, a gas, water, fuel, and other elements.

Further, sealants also may be used to reduce effects from electromagnetic events. For example, sealants may be used in the interior of a composite fuel tank in an aircraft. The composite fuel tank is typically integrated into a composite wing of the aircraft. An electromagnetic event, such as a lightning strike, may cause sparking, electrical arcs, or other undesired events in the interior of the composite fuel tank. For example, electrical arcs may occur at locations where fasteners are present in the interior of a composite fuel tank. These types of events may be prevented through the use of sealants.

For example, a sealant may be applied to the interior portions of fasteners that extend into the interior of the composite fuel tank. Arcing may be prevented when a desired level of thickness is present for the sealant applied to a fastener that extends into the interior of the composite fuel tank.

After the sealant has been applied to fasteners in the composite fuel tank, an inspection is performed to determine whether the sealant has the desired level of thickness over the fasteners. This inspection is currently performed by a human operator using a hand-held gauge to measure the dimensions of the sealant applied to the fastener.

This type of process is tedious and time consuming. For example, composite fuel tanks in an aircraft may have thousands of fasteners that extend into the interior of the composite fuel tanks. Further, accessing the interior of a wing in which a composite fuel tank is located also may be difficult, depending on the design of the aircraft.

Further, depending on the rework needed to apply more sealant and the additional inspections performed after rework is completed, undesired delays may occur. As a result, inspecting sealant thickness in a composite fuel tank may increase the cost and time needed to manufacture the aircraft.

Therefore, it would be desirable to have a method and apparatus that takes into account at least some of the issues discussed above as well as other possible issues.

SUMMARY

In one illustrative embodiment, a method for inspecting sealant on an object is present. First data is generated for a first geometry of a first surface of the object prior to sealing the object. Second data is generated for a second geometry of a second surface of the object after the sealant has been applied to the object. A difference is identified between the first data and the second data. The difference indicates a thickness of the sealant on the object.

In another illustrative embodiment, an apparatus comprises a thickness analyzer. The thickness analyzer is configured to generate first data for a first geometry of a first surface of an object prior to sealing the object. The thickness analyzer is further configured to generate second data for a second geometry of a second surface of the object after a sealant has been applied to the object. The thickness analyzer is further configured to identify a difference between the first data and the second data. The difference indicates a thickness of the sealant on the object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 14 is an illustration of a data processing system in accordance with an illustrative embodiment;

DETAILED DESCRIPTION

The illustrative embodiments recognize and take into account one or more different considerations. For example, the illustrative embodiments recognize and take into account that in addition to being time consuming and tedious, the existing inspection systems also may lack a desired level of accuracy. For example, identifying the location of a fastener may be difficult once fasteners in the fuel tank are covered by sealant.

Additionally, sealant may flow such that the thickness of the sealant varies over different parts of a fastener. In other words, the thickness of the sealant covering a fastener may not be consistent. As a result, a human operator using a gauge may think that the sealant has a desired level of thickness based on the measurement, but a portion of the fastener may not have the desired level of thickness.

Thus, the illustrative embodiments provide a method and apparatus for inspecting sealants. In one illustrative embodiment, first data is generated for a first geometry of a first surface of an object prior to sealing the object. Second data for a second geometry of a second surface of the object is generated after a sealant has been applied to the object. A difference between the first data and the second data is identified. This difference indicates a thickness of the sealant on the object.

Figure 1:
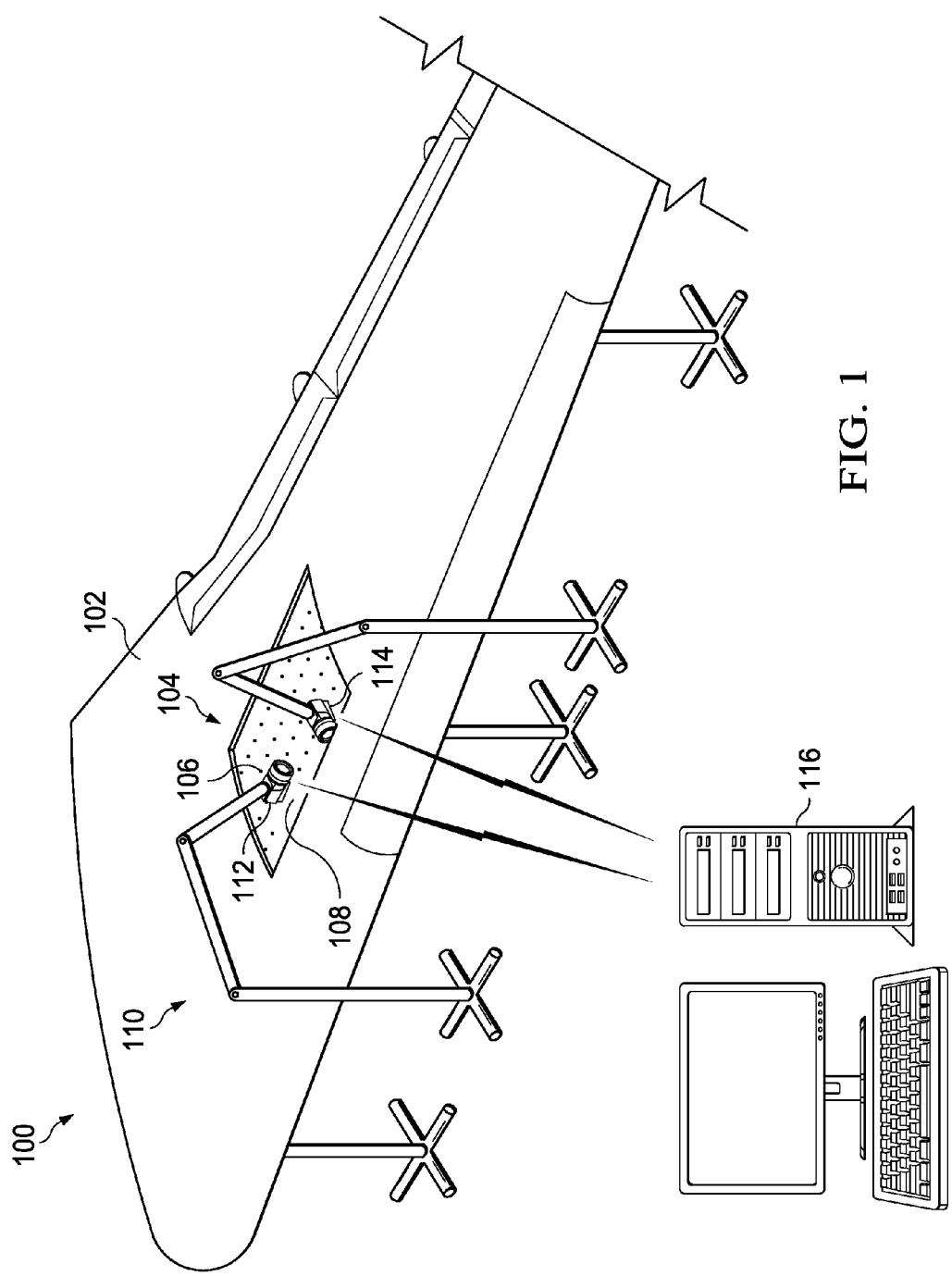
FIG. 1 is a pictorial illustration of a sealant measurement environment in accordance with an illustrative embodiment.

With reference now to the figures and, in particular, with reference to FIG. 1, a pictorial illustration of a sealant measurement environment is depicted in accordance with an illustrative embodiment. As depicted, sealant measurement environment 100 includes wing 102. As depicted, wing 102 has composite fuel tank 104 with fasteners 106 having portions extending into interior 108 of composite fuel tank 104. Sealant may be applied to fasteners 106. In particular, sealant is applied to the portions of fasteners 106 in interior 108 of composite fuel tank 104 to reduce effects from electromagnetic events.

In these illustrative examples, sealant measurement system 110 is used to measure a thickness of the sealant applied to fasteners 106. In this illustrative example, sealant measurement system 110 includes three-dimensional scanner 112, three-dimensional scanner 114, and computer 116.

Computer 116 identifies a first geometry of the surfaces of fasteners 106 prior to those fasteners being covered with sealant. The geometry of the surfaces of the fasteners is identified by scanning fasteners 106 using three-dimensional scanner 112 and three-dimensional scanner 114 in this illustrative example. These scanners generate first data about the first geometry of the surfaces of fasteners 106 as well as the geometry of other objects that are scanned.

This first data may take the form of a point cloud. Each vertex or piece of data in the point cloud represents a location detected by a three-dimensional scanner in three-dimensional space.

The first data generated by three-dimensional scanner 112 and three-dimensional scanner 114 about the first geometry of the surfaces of fasteners 106 is sent to computer 116. In these illustrative examples, this first data may be sent to computer 116 over wireless communications links. With this first data, computer 116 identifies a first geometry of the surfaces of fasteners 106.

Sealant may then be applied to fasteners 106 to cover the portion of fasteners 106 in interior 108 of composite fuel tank 104. With the application of sealant, the surface of fasteners 106 changes. In other words, the sealant on fasteners 106 forms a new surface for fasteners 106 in these illustrative examples.

Three-dimensional scanner 112 and three-dimensional scanner 114 then scan fasteners 106 with the sealant applied to fasteners 106. The scanning of fasteners 106 after applying the sealant provides second data for a second geometry of the surfaces of fasteners 106 with the sealant.

The second data about the second geometry for the surfaces of fasteners 106 with the sealant is sent by three-dimensional scanner 112 and three-dimensional scanner 114 to computer 116. Computer 116 uses the first data and the second data to identify a thickness of the sealant on fasteners 106.

For example, computer 116 identifies a difference between the first data for the first geometry of the surfaces of fasteners 106 without the sealant and the second data for the second geometry of the surfaces of fasteners 106 with the sealant.

With the difference, a determination can be made as to whether the thickness of the sealant for fasteners 106 has a desired thickness. If the sealant on a fastener in fasteners 106 does not have the desired thickness, the sealant on the fastener is considered to have an insufficient thickness. Additional sealant may be applied to the fastener.

With the first data and the second data, computer 116 may identify which portion of a fastener does not have a desired thickness in addition to which fastener does not have the desired thickness. In this manner, sealant measurement system 110 provides a greater granularity in identifying locations where additional sealant may be needed.

As a result, sealant measurement system 110 may provide measurement of the thickness of sealant on objects, such as fasteners in a composite fuel tank, as compared to current methods of using gauges. Further, sealant measurement system 110 may provide a finer granularity, more accuracy, or both with respect to whether additional sealant may be needed.

Figure 2:
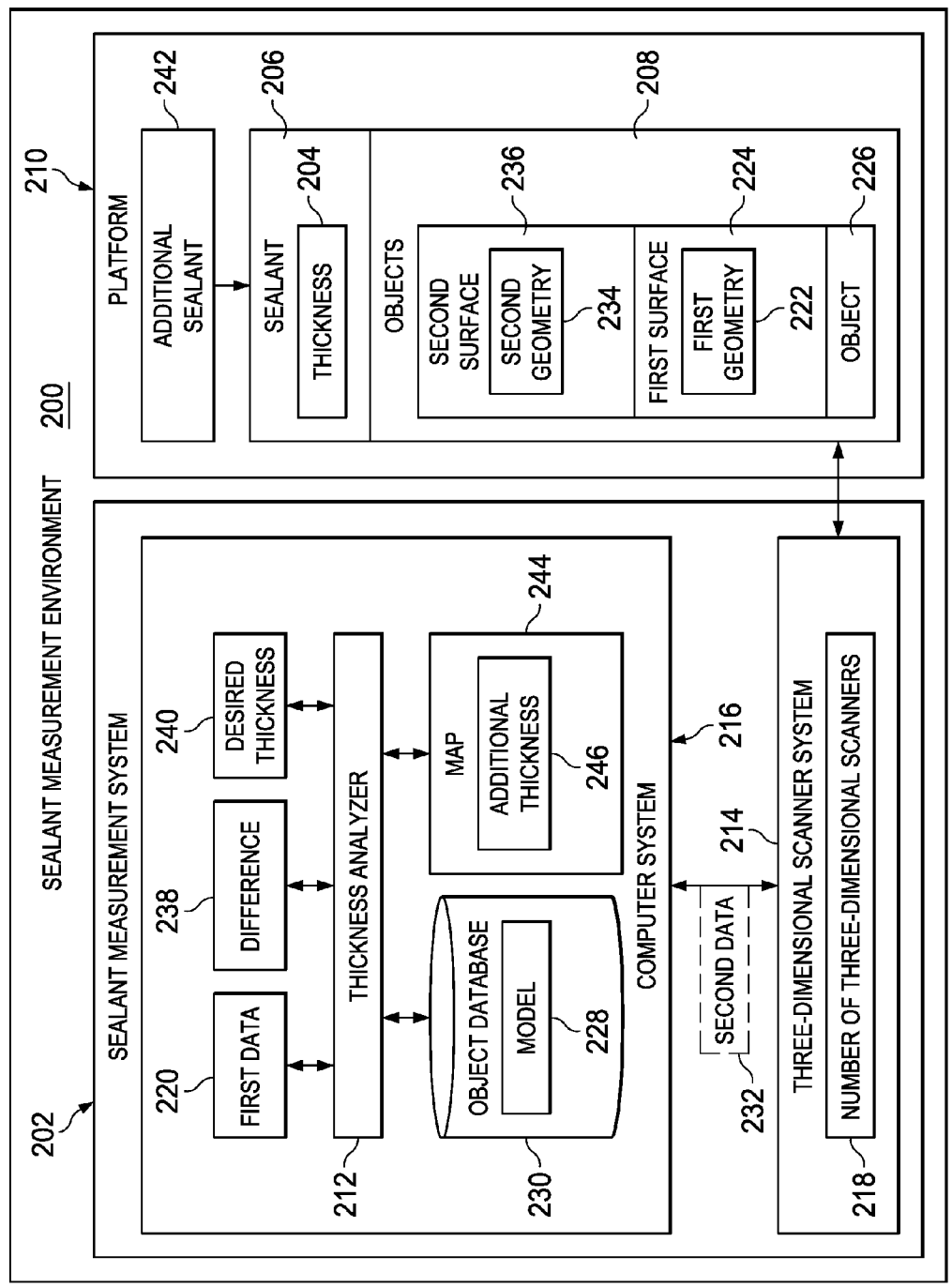
FIG. 2 is an illustration of a block diagram of a sealant measurement environment in accordance with an illustrative embodiment.

Turning now to FIG. 2, an illustration of a block diagram of a sealant measurement environment is depicted in accordance with an illustrative embodiment. Sealant measurement environment 200 is an example of sealant measurement environment 100 in FIG. 1.

As depicted, sealant measurement environment 200 includes sealant measurement system 202. Sealant measurement system 202 may be used to measure thickness 204 of sealant 206 on objects 208 associated with platform 210.

When one component is "associated" with another component, the association is a physical association in these depicted examples. For example, a first component, such as an object in objects 208, may be considered to be associated with a second component, such as platform 210, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component. In these illustrative examples, platform 210 may be an aircraft. Objects 208 may be, for example, fasteners used in the aircraft.

As depicted, sealant measurement system 202 comprises thickness analyzer 212 and three-dimensional scanner system 214. Thickness analyzer 212 may be implemented using hardware, software, or a combination of the two. For example, thickness analyzer 212 may be implemented in computer system 216. Computer system 216 is a number of computers. As used herein, a "number of", when used with reference to items, means one or more items. For example, a number of computers is one or more computers. When more than one computer is present in computer system 216, those computers may be in communication with each other.

Three-dimensional scanner system 214 is configured to generate data about the surfaces of objects 208 as well as surfaces of any other objects or components for platform 210. In these illustrative examples, three-dimensional scanner system 214 may comprise number of three-dimensional scanners 218. Number of three-dimensional scanners 218 may be implemented using any device that is configured to generate data about the surface of objects 208. For example, number of three-dimensional scanners 218 may be implemented using a laser scanner.

In these illustrative examples, sealant measurement system 202 is configured to generate first data 220 for first geometry 222 of first surface 224 of object 226 in objects 208. First surface 224 of object 226 is identified without sealant 206 on object 226. This identification of first data 220 may be obtained for other objects in objects 208 in addition to object 226.

In these illustrative examples, the identification of first data 220 may be performed in a number of different ways. For example, three-dimensional scanner system 214 may scan object 226 and generate first data 220 for first geometry 222 of first surface 224 of object 226. In this particular example, sealant 206 is not applied to object 226 until object 226 has been scanned by three-dimensional scanner system 214.

In other illustrative examples, first data 220 may be generated by thickness analyzer 212. In this example, thickness analyzer 212 may access model 228 of object 226 from object database 230. Thickness analyzer 212 may identify surfaces for object 226 and geometries for those surfaces from model 228 of object 226. Thickness analyzer 212 may generate first data 220 from the identification of the geometries of the surfaces of object 226 in model 228. In this example, sealant 206 may be applied at any time, because object 226 without sealant 206 is not scanned.

In other illustrative examples, first data 220 may be generated from a combination of three-dimensional scanner system 214 scanning object 226 and from thickness analyzer 212 obtaining data about object 226 from model 228. The combination of data may be used when portions of object 226 cannot be scanned by three-dimensional scanner system 214. This situation may result in the data generated by three-dimensional scanner system 214 being incomplete for use as first data 220 to identify first geometry 222 of first surface 224 of object 226.

The inability to scan enough of first surface 224 of object 226 may occur through occlusions. In other words, three-dimensional scanner system 214 may not have a sufficient view or line of sight to portions of first surface 224 of object 226. In this manner, data from model 228 may be used to fill in the missing portions that are not scanned by three-dimensional scanner system 214.

After first data 220 has been generated, second data 232 is generated for second geometry 234 for second surface 236 of object 226 with sealant 206. In this illustrative example, second surface 236 of object 226 is the surface of object 226 with sealant 206. In other words, second data 232 is based on the surface formed by sealant 206 on object 226.

Thickness analyzer 212 identifies difference 238 between first data 220 and second data 232. In other words, the volume encompassed by object 226 may be subtracted from the volume encompassed by second surface 236 with sealant 206. Difference 238 indicates thickness 204 of sealant 206. Thickness 204 may be compared to desired thickness 240 for sealant 206.

If thickness 204 is equal to or more than desired thickness 240, then additional sealant 242 is not needed for object 226.

On the other hand, if thickness 204 is less than desired thickness 240, additional sealant 242 may be applied to object 226.

In these illustrative examples, map 244 may be generated by thickness analyzer 212. Map 244 identifies thickness 204 of sealant 206 on different parts of object 226. As a result, a finer granularity of where additional sealant 242 may be needed for object 226 if thickness 204 of sealant 206 does not have desired thickness 240 is provided. For example, thickness 204 for sealant 206 may have desired thickness 240 on one side of object 226 but not on another side of object 226. Map 244 may identify the side of object 226 needing additional sealant 242. Additionally, map 244 may indicate additional thickness 246 of additional sealant 242 needed for object 226. The identification of additional thickness 246 of additional sealant 242 allows for the application of additional sealant 242 to obtain desired thickness 240 as accurately as desired in these illustrative examples.

In these illustrative examples, desired thickness 240 is a thickness at which a number of desired performance parameters is met. The number of performance parameters may be, for example, a reduction in electrical arcing, a desired level of leak resistance, the desired minimum or maximum weight of sealant per location, and other suitable performance parameters.

The illustration of sealant measurement environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although objects 208 have been described as fasteners generally, these fasteners may be, without limitation, a rivet, a bolt with a nut engaged with the bolt, a screw, a pin and collar fastener, nut plates, and other suitable components. In another example, an object in objects 208 may be a single part or an assembly of parts. For example, without limitation, an object may be a reinforcing strip, a stiffener, a lap joint, a bracket, a tie bar, a spar, a fuel tank, a wing, a composite barrel for a fuselage, a wing box, and some other suitable type of object. The object may be any object mounted on a surface that uses sealant between the object and the fastener or the object and the surface.

As another example, although platform 210 has been described as an aircraft, platform 210 may take other forms. Platform 210 also may be, for example, without limitation, a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

As yet another illustrative example, although number of three-dimensional scanners 218 has been described as being implemented using laser scanners, number of three-dimensional scanners 218 may be implemented using other types of three-dimensional scanners in addition to or in place of laser scanners. Any type of device that is configured to collect data about the geometries of the surface of object 226 may be used. For example, a contact scanner may be used in three-dimensional scanner system 214.

Further, three-dimensional scanner system 214 may include different types of scanners in number of three-dimensional scanners 218. For example, one scanner in number of three-dimensional scanners 218 may be of a first type, such as a laser scanner, and another scanner in number of three-dimensional scanners 218 may be of a different type, such as a contact scanner.

Figure 3:
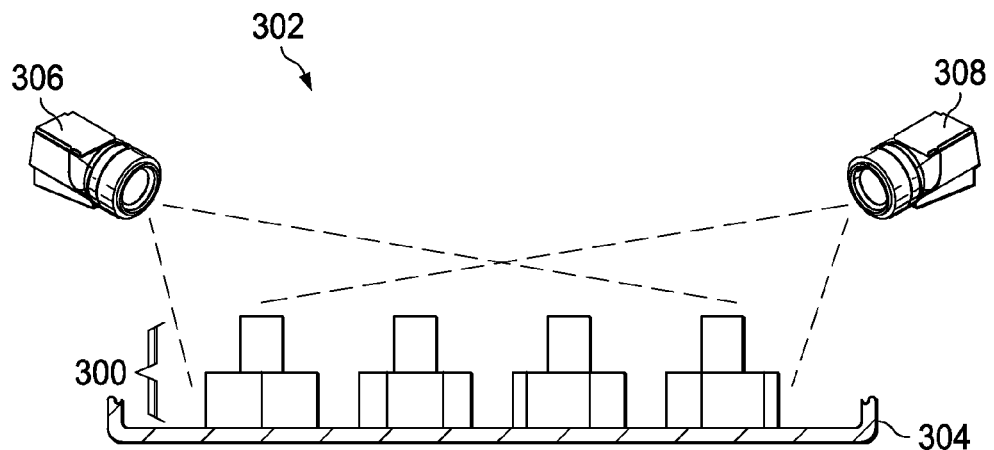
FIG. 3 is an illustration of fasteners in the interior of a composite fuel tank in accordance with an illustrative embodiment.

Turning now to FIG. 3, an illustration of fasteners in the interior of a composite fuel tank is depicted in accordance with an illustrative embodiment. In this illustrative example, a portion of fasteners 300 extend into interior 302 of composite fuel tank 304. As depicted, three-dimensional scanner 306 and three-dimensional scanner 308 both scan and generate data about fasteners 300. In particular, the data is data about points on the surface of fasteners 300.

Figure 4:
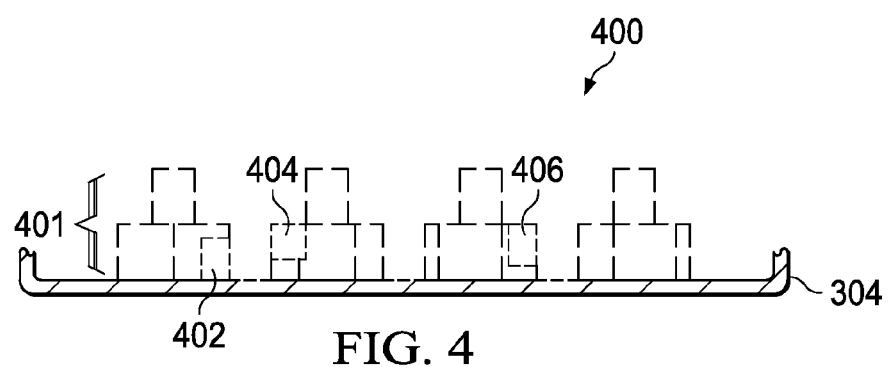
FIG. 4 is an illustration of data collected for fasteners on a display where some of the data is missing, in accordance with an illustrative embodiment.

Turning now to FIG. 4, an illustration of data collected for fasteners on a display where some of the data is missing is depicted in accordance with an illustrative embodiment. In this illustrative example, display 400 is an image with representations 401 of fasteners 300 in FIG. 3. Display 400 is an example of a display that may be shown on a display in computer system 216 in FIG. 2. Although display 400 shows fasteners, the information about the fasteners is stored and is not always displayed in display 400, depending on the implementation.

As can be seen, section 402, section 404, and section 406 in representations 401 of fasteners 300 in display 400 are sections of fasteners 300 not shown. These sections are missing in these examples due to occlusions of three-dimensional scanner 306 and three-dimensional scanner 308.

Figure 5:
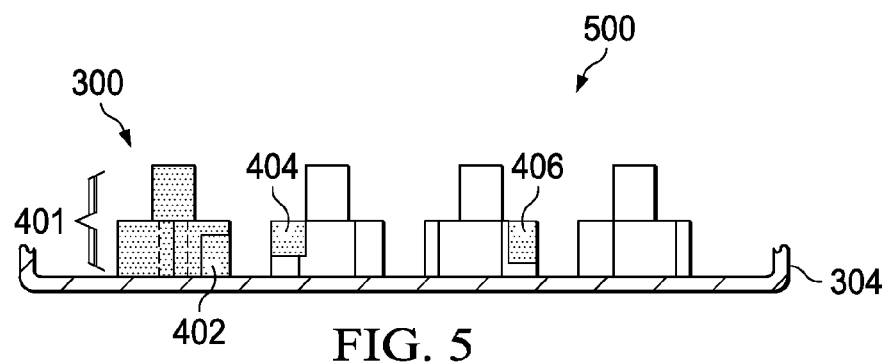
FIG. 5 is an illustration of a display of data collected for fasteners with additional data filling in missing information in accordance with an illustrative embodiment.

Turning now to FIG. 5, an illustration of a display of data collected for fasteners with additional data filling in missing information is depicted in accordance with an illustrative embodiment. Display 500 is another example of a display that may be shown on a display in computer system 216 in FIG. 2. Display 500 illustrates the first data for the first geometry of the first surface of these fasteners prior to the fasteners being sealed.

In display 500, section 402, section 404, and section 406 are now shown in representations 401 for fasteners 300 in display 500. These sections are filled in using data from a model of fasteners 300. Model 228 in object database 230 in FIG. 2 may be one implementation for the model used to provide data for fasteners 300. Of course, the information for the missing sections may be supplied from another source in other examples. An example of another source may be a hand-held three-dimensional scanner.

Figure 6:
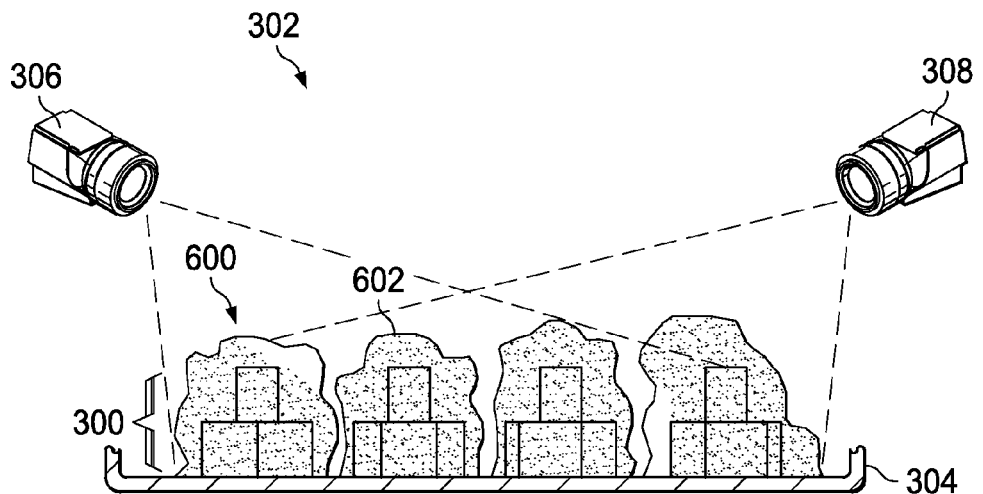
FIG. 6 is an illustration of fasteners with sealant in accordance with an illustrative embodiment.

Turning now to FIG. 6, an illustration of fasteners with sealant is depicted in accordance with an illustrative embodiment. In this illustrative example, fasteners 300 are covered with sealant 600. Fasteners 300 are shown in phantom to illustrate a thickness of sealant 600 over fasteners 300.

Three-dimensional scanner 306 and three-dimensional scanner 308 perform a scan of fasteners 300 with sealant 600 covering fasteners 300. Three-dimensional scanner 306 and three-dimensional scanner 308 generate second data for a second geometry of surface 602 of fasteners 300. This surface of fasteners 300 is defined by sealant 600.

Figure 7:
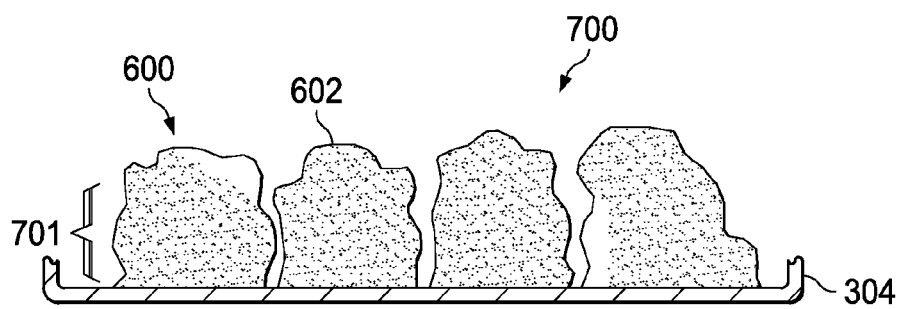
FIG. 7 is an illustration of a display of data collected for fasteners covered by sealant in accordance with an illustrative embodiment.

Turning now to FIG. 7, an illustration of a display of data collected for fasteners covered by sealant is depicted in accordance with an illustrative embodiment. Display 700 is an example of a display that may be shown on a display in computer system 216 in FIG. 2.

In this illustrative example, display 700 includes representations 701 for fasteners 300 in FIG. 3 covered by sealant 600. The display of representations 701 in display 700 is made using the second data for the second geometry of surface 602 of fasteners 300 as covered by sealant 600.

Figure 8:
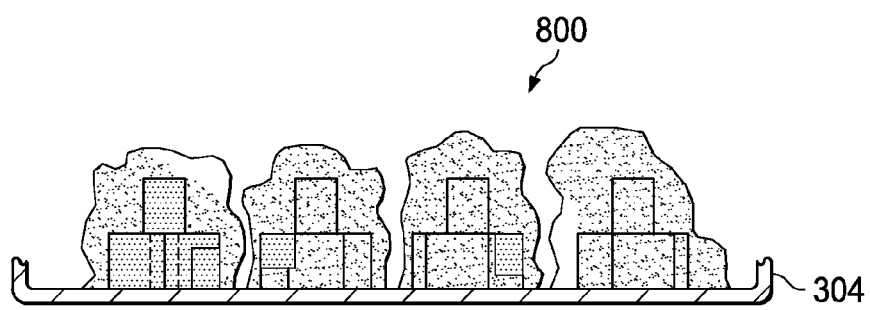
FIG. 8 is an illustration of a comparison of first data to second data in accordance with an illustrative embodiment.

Turning now to FIG. 8, an illustration of a comparison of first data to second data is depicted in accordance with an illustrative embodiment. Display 800 is another example of a display that may be shown on a display in computer system 216 in FIG. 2. Display 800 illustrates a comparison of the first data illustrated in FIG. 5 and the second data illustrated in FIG. 7.

The data shown in this image may be analyzed to identify the thickness of the sealant on fasteners 300 in FIG. 3. The difference between the first data and the second data may be used to identify a thickness for different portions of fasteners 300.

The different displays illustrated in FIGS. 3-8 are provided for purposes of depicting some of the operations performed. The information in the different operations is stored and does not necessarily have to be displayed on a display device. For example, displays may be displayed on a display device when a discrepancy between a desired thickness of sealant and the measured thickness of the sealant is present. If the condition is satisfactory, the information may not be displayed. In other words, the different operations may be performed without needing user input, and reports may be generated only when action is needed to add sealant.

Figure 9:
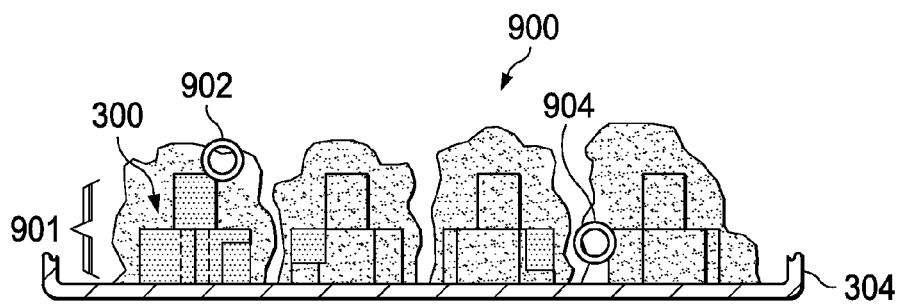
FIG. 9 is an illustration of a map of sealant thickness with locations where additional sealant is needed being indicated in accordance with an illustrative embodiment.

Turning now to FIG. 9, an illustration of a map of sealant thickness with locations where additional sealant is needed being indicated is depicted in accordance with an illustrative embodiment. Display 900 is another example of a display that may be shown on a display in computer system 216 in FIG. 2. In this illustrative example, map 901 of fasteners 300 is presented on display 900 and includes graphical indicator 902 and graphical indicator 904. These graphical indicators displayed in map 901 identify locations on fasteners 300 where additional sealant may be needed. In other words, display 900 indicates where the thickness is not as thick as desired.

Figure 10:
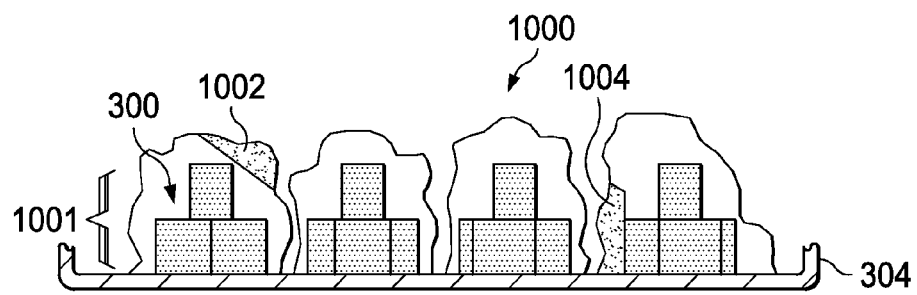
FIG. 10 is an illustration of a map of sealant thickness including guides for adding sealant in accordance with an illustrative embodiment.

Turning now to FIG. 10, an illustration of a map of sealant thickness including guides for adding sealant is depicted in accordance with an illustrative embodiment. Display 1000 is another example of a display that may be shown on a display in computer system 216 in FIG. 2. Display 1000 shows map 1001 of fasteners 300. In this depicted example, graphical indicator 1002 and graphical indicator 1004 in map 1001 identify the additional thickness of additional sealant that should be added to fasteners 300. In the illustrative examples, the surface of the sealant may be abraded or otherwise changed to provide better adhesion for the additional sealant. The removal of the original sealant for this purpose also may be taken into account in map 1001. In other cases, the sealant is not changed before adding the additional sealant.

The illustration of display 400 in FIG. 4, display 500 in FIG. 5, display 700 in FIG. 7, display 800 in FIG. 8, display 900 in FIG. 9, and display 1000 in FIG. 10 are not meant to limit the manner in which information may be presented on a display. For example, the information may be displayed as a three-dimensional image rather than in two dimensions as depicted in these illustrative examples. Further, other information or annotations also may be included in the displays or stored in the computer for later retrieval and analysis. For example, the information shown on the displays in FIGS. 4-10 may also be used for trend analysis and process improvement planning.

Figure 11:
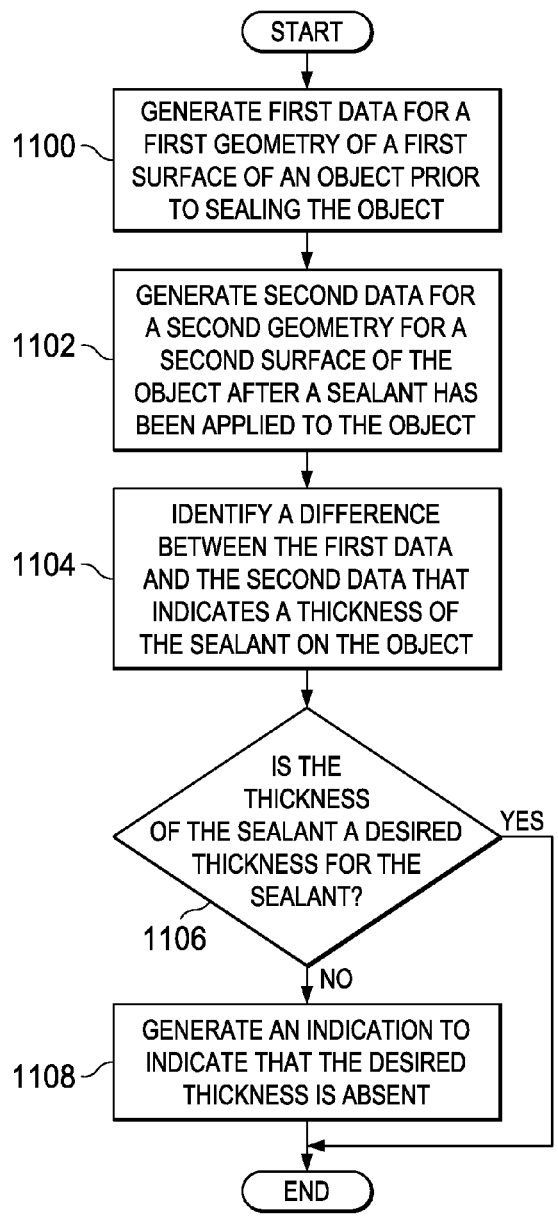
FIG. 11 is a flowchart of a process for inspecting sealant on an object in accordance with an illustrative embodiment.

With reference now to FIG. 11, a flowchart of a process for inspecting sealant on an object is depicted in accordance with an illustrative embodiment. The process illustrated in FIG. 11 may be implemented in sealant measurement environment 100 in FIG. 1 or sealant measurement environment 200 in FIG. 2. In particular, the process may be implemented using sealant measurement system 110 in FIG. 1 or sealant measurement system 202 in FIG. 2.

The process begins by generating first data for a first geometry of a first surface of an object prior to sealing the object (operation 1100). The first data may be generated from scanning the object, a model of the object, or a combination of the two. Both a scan of the object and a model of the object may be used if occlusions block the three-dimensional scanners.

The process generates second data for a second geometry for a second surface of the object after a sealant has been applied to the object (operation 1102). The process then identifies a difference between the first data and the second data that indicates a thickness of the sealant on the object (operation 1104).

A determination is made as to whether the thickness of the sealant is a desired thickness for the sealant (operation 1106). If the thickness of the sealant is the desired thickness, all parts of the object have the desired thickness. If one part of the object does not have the desired thickness, then the thickness of the sealant is not considered to have the desired thickness even though other parts of the object may have the desired thickness for the sealant.

If the thickness of the sealant is not a desired thickness, an indication is generated to indicate that the desired thickness is absent (operation 1108), with the process terminating thereafter. This indication may take the form of graphical indicators on a map. The graphical indicators may indicate locations on the part of the object at which the desired thickness is absent for the sealant. The graphical indicators also may indicate an amount of sealant to be added to the locations.

With reference again to operation 1106, if the sealant has a desired thickness, the process also terminates. In some cases, a report may be generated indicating the results of the inspection of the object. This process may be performed for each object of interest. The process may be performed by repeating the operations. In other illustrative examples, the process in FIG. 11 may be performed at the same time for all of the objects of interest.

Further, the process in FIG. 11 may be performed for the same part that is manufactured for the same type or model of an aircraft. The collection of data is saved. This data forms sets of data that may be analyzed for trends where thicknesses may occur often enough to warrant a change in the operations performed in applying sealant to avoid the undesired thickness in future applications of sealant to the same parts in the same type of aircraft.

Figure 12:
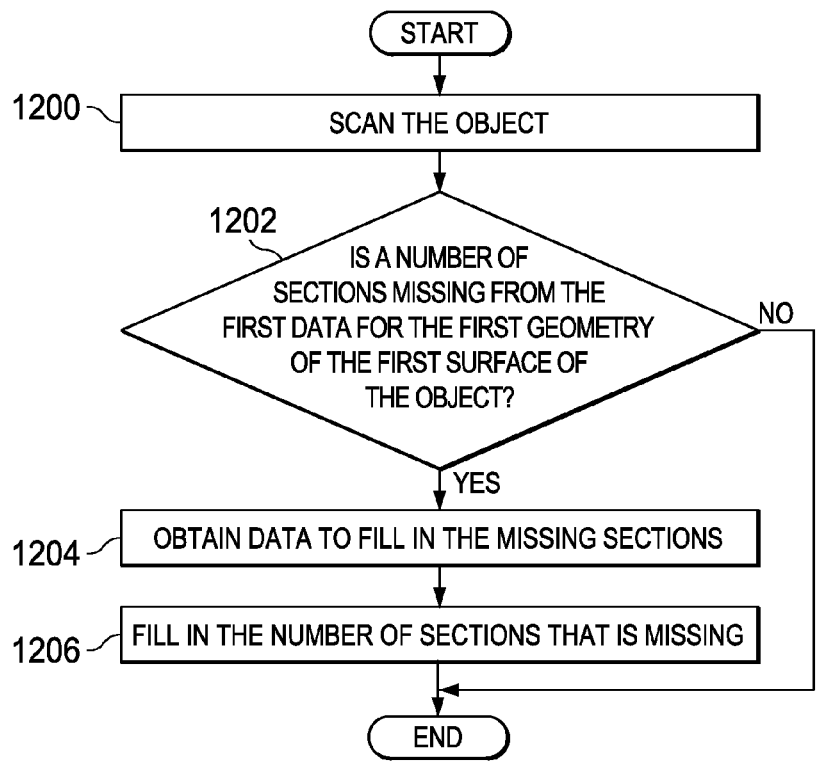
FIG. 12 is a flowchart of a process for generating first data for the first geometry of a first surface of an object in accordance with an illustrative embodiment.

With reference next to FIG. 12, a flowchart of a process for generating first data for the first geometry of a first surface of an object is depicted in accordance with an illustrative embodiment. The process in FIG. 12 is an example of an implementation of operation 1100 in FIG. 11.

The process begins by scanning the object (operation 1200). The scanning is performed using three-dimensional scanner system 214 in FIG. 2 in these examples. Operation 1200 results in data collected about the first geometry of a first surface of an object.

A determination is made as to whether a number of sections is missing from the first data for the first geometry of the first surface of the object (operation 1202). If a number of sections is missing, data is obtained to fill in the missing sections (operations 1204). The data may be obtained in a number of different ways. For example, the data may be from a model of the object. The data also may be obtained from another scan of the object using a hand-held three-dimensional scanner or by repositioning scanners in the three-dimensional scanner system.

The process then fills in the number of sections that is missing (operation 1206), with the process terminating thereafter. With reference again to operation 1202, if a number of sections is not missing, the process terminates.

Figure 13:
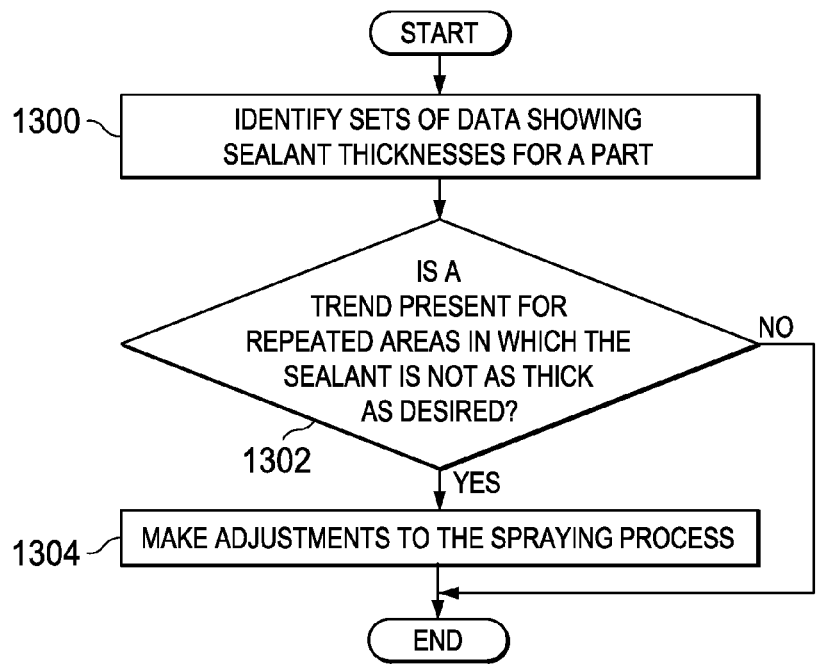
FIG. 13 is a flowchart of a process for analyzing data of sealant thickness in accordance with an illustrative embodiment.

In FIG. 13, a flowchart of a process for analyzing data of sealant thickness is depicted in accordance with an illustrative embodiment. The process in FIG. 13 may be used to identify changes in manufacturing processes.

The process begins by identifying sets of data showing sealant thicknesses for a part (operation 1300). The sets of data are data for the same type of part that is processed over some number of times. For example, the sets of data may be sealant sprayed on fasteners for manufacturing the same type of fuel tank.

The process analyzes the data to determine whether a trend is present for repeated areas in which the sealant is not as thick as desired (operation 1302). If a trend is present, adjustments are made to the spraying process (operation 1304), with the process terminating thereafter. Otherwise, if a trend is not present in operation 1302, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 14, an illustration of a data processing system is depicted in accordance with an illustrative embodiment. Data processing system 1400 may be used to implement computer system 216 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Figure 16:
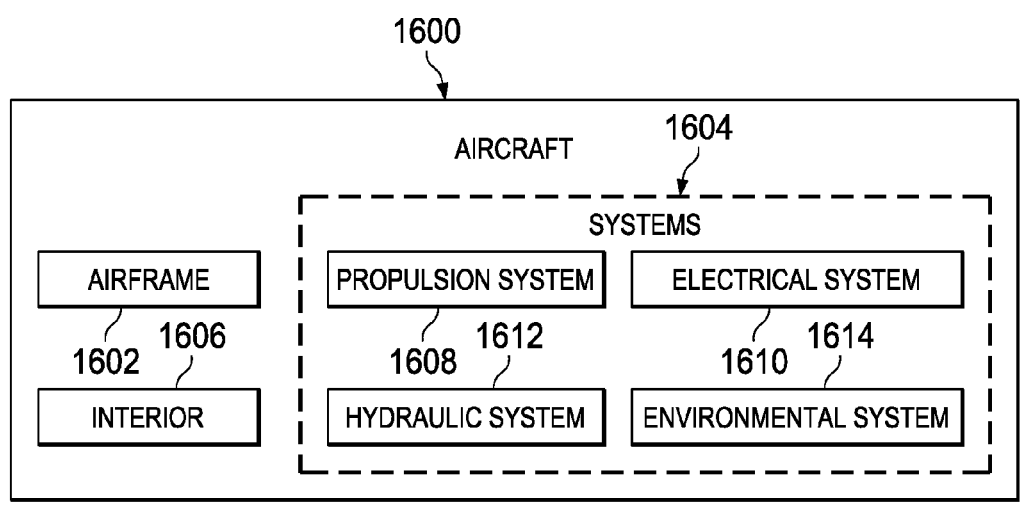
FIG. 16 is an illustration of an aircraft in which an illustrative embodiment may be implemented.
Figure 15:
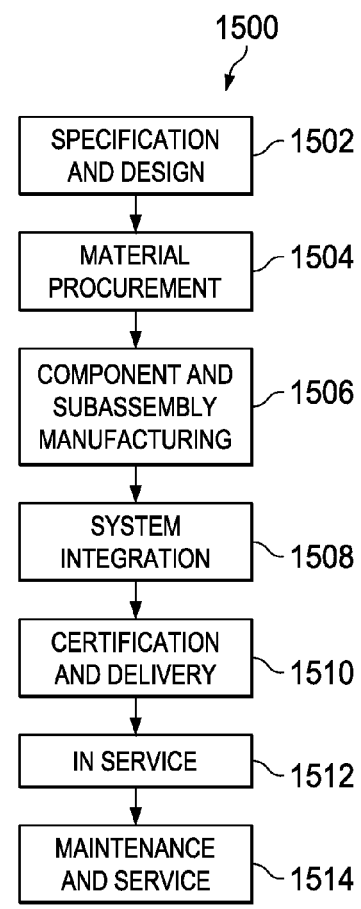
FIG. 15 is an illustration of an aircraft manufacturing and service method in accordance with an illustrative embodiment.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. For example, sealant measurement system 202 in FIG. 2 may be used to perform inspections of sealant thicknesses on fasteners or other objects in components and subassemblies.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized to perform inspections of sealant thickness during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15 to perform inspections of sealant thickness on fasteners and other objects. The inspection may be used to determine whether changes in the thickness of sealant have occurred from exposure to the environment or from other operating conditions. The use of a number of the different illustrative embodiments may substantially expedite the assembly of and/or reduce the cost of aircraft 1600.

Thus, the illustrative embodiments provide a method and apparatus for inspecting sealants on objects. With the different illustrative embodiments, the amount of time and labor needed to inspect sealants used in platforms, such as aircraft, may the reduced. For example, with the use of one or more illustrative embodiments, the manual measurement of sealant on fasteners by human operators using gauges may be reduced or eliminated. With the use of a three-dimensional scanning system, the acquisition of data may be made more quickly and accurately as compared to currently used methods. As a result, the inspection time needed for aircraft may be reduced.

Further, when insufficient amounts of sealant are present, the amount of sealant used to rework the areas needing more sealant may be made more accurately using the illustrative embodiments. As a result, the amount of additional sealant may be reduced. This reduction also may aid in reducing the weight of an aircraft or other platforms.

The description of the different illustrative embodiments has been presented for purposes of illustration and description and is not intended to be exhaustive or limited to the embodiments in the form disclosed. Many modifications and variations will be apparent to those of ordinary skill in the art. For example, although the illustrative embodiments have been described with respect to composite fuel tanks, the illustrative embodiments may be applied to other types of fuel tanks, such as, for example, metal fuel tanks integrated into metal wings of an aircraft. In fact, the illustrative embodiments may be applied to a sealant or other liquid material that may be placed on an object. For example, the illustrative embodiments may be applied to paint that is applied to coat an object.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting sealant on an object, the method comprising:
   generating first data for a first geometry of a first surface of the object prior to sealing the object, wherein generating the first data for the first geometry of the first surface of the object comprises using a model of the object in a database in combination with scanning the first surface of the object, wherein portions of the first surface cannot be scanned due to an occlusion caused by a line of sigh obstruction to a portion of the first surface, and wherein data from the model of the object in the database is used to fill in the portions not scanned to generate the first data for the first geometry of the first surface of the object;
   generating second data for a second geometry of a second surface of the object after the sealant has been applied to the object; and
   identifying a difference between the first data and the second data to determine a thickness of the sealant on the object.

2. The method of claim 1 further comprising:
   applying the sealant to the object to form the second surface of the object.

3. The method of claim 1 further comprising:
   applying additional sealant to a portion of the surface with the sealant having an insufficient thickness.

4. The method of claim 1 further comprising:
   determining whether the thickness of the sealant on the object is a desired thickness for the sealant.

5. The method of claim 4, wherein the desired thickness is the thickness at which a number of desired performance parameters is met.

6. The method of claim 1 further comprising:
   generating a map identifying the thickness of the sealant on different parts of the object.

7. The method of claim 1, wherein scanning the first surface of the object generates data about locations on the first surface of the object.

8. The method of claim 7, wherein the data is a point cloud of the object.

9. The method of claim 1, wherein generating the second data for the second geometry of the second surface of the object comprises:
   scanning the second surface of the object to generate data about locations on the second surface of the object.

10. The method of claim 1, wherein the object is selected from one of a fastener, a rivet, a bolt with a nut engaged with the bolt, a reinforcing strip, a stiffener, a lap joint, a bracket, a tie bar, a spar, a fuel tank, a wing, a composite barrel for a fuselage, and a wing box.

11. The method of claim 1, wherein the object is inside of a fuel tank.

12. The method of claim 1, wherein the object is in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a dam, a manufacturing facility, and a building.

13. A method for inspecting an interior of a wing of an aircraft, the wing including a composite fuel tank with fasteners, wherein the fasteners are in the interior of the wing, wherein portions of the fasteners extend into the composite fuel tank, and wherein a corresponding sealant covers each of the fasteners, the method comprising:
   generating first data for a first geometry of a first surface of the interior of the wing prior to sealing the fasteners, wherein generating the first data for the first geometry of the first surface of the interior of the wing comprises using a model of the wing in a database in combination with scanning the first surface of the interior of the wing, wherein portions of the interior of the wing cannot be scanned by a scanner system due to an occlusion caused by a line of sight obstruction to a portion of the first surface, and wherein data from the model of the wing in the database is used to fill in the portions not scanned by the scanner system to generate the first data for the first geometry of the first surface of the interior of the wing;
   generating second data for a second geometry of a second surface of the interior of the wing after the corresponding sealant has been applied to the fasteners; and
   identifying a difference between the first data and the second data to determine a thicknesses of the corresponding sealant for the fasteners.

14. The method of claim 13, wherein the first surface and the second surface are inside the composite fuel tank.

15. The method of claim 13 further comprising:
   for each fastener having an amount of the corresponding sealant less than a desired amount, adding additional sealant to the each fastener.

16. The method of claim 15 further comprising:
   storing the first data, the second data, and the difference; and analyzing the first data, the second data, and the difference to determine whether a trend is present for repeated areas in which the corresponding sealant is not as thick as desired.

17. The method of claim 16 further comprising:

changing a spraying process for subsequent applications based on the trend.

\* \* \* \* \*